United States Patent
Modi et al.

(10) Patent No.: US 10,037,504 B2
(45) Date of Patent: Jul. 31, 2018

(54) METHODS FOR DETERMINING MANUFACTURING WASTE TO OPTIMIZE PRODUCTIVITY AND DEVICES THEREOF

(71) Applicant: Wipro Limited, Bangalore (IN)

(72) Inventors: Krupal Chandresh Modi, Ahmedabad (IN); Rinku Vatnani, Indore (IN); Akash Gupta, Jaipur (IN); Akbar Abdulmalik Ladak, Bangalore (IN)

(73) Assignee: Wipro Limited, Bangalore (IN)

( * ) Notice: Subject to any disclaimer, the term of this patent is extended or adjusted under 35 U.S.C. 154(b) by 509 days.

(21) Appl. No.: 14/670,528

(22) Filed: Mar. 27, 2015

(65) Prior Publication Data
US 2016/0239769 A1  Aug. 18, 2016

(30) Foreign Application Priority Data
Feb. 12, 2015  (IN) .............. 690/CHE/2015

(51) Int. Cl.
*G06Q 10/00* (2012.01)
*G06Q 10/06* (2012.01)
(Continued)

(52) U.S. Cl.
CPC ..... *G06Q 10/0633* (2013.01); *G06K 9/00369* (2013.01); *G06K 9/00718* (2013.01);
(Continued)

(58) Field of Classification Search
CPC .......... G06Q 10/00–50/00; G06K 1/00–21/00; G06T 1/00–19/00
(Continued)

(56) References Cited

U.S. PATENT DOCUMENTS 4,413,277 A * 11/1983 Murray ............ G06Q 10/06398
                                                        348/86
5,212,635 A *  5/1993 Ferriter ............ G06Q 10/06398
                                                        340/309.7
(Continued)

FOREIGN PATENT DOCUMENTS

WO        0157700 A2     8/2001

OTHER PUBLICATIONS

Gong, Jie, and Carlos H. Caldas. "An object recognition, tracking, and contextual reasoning-based video interpretation method for rapid productivity analysis of construction operations." Automation in Construction 20.8 (2011): 1211-1226.*
(Continued)

*Primary Examiner* — Alan S Miller
(74) *Attorney, Agent, or Firm* — LeClairRyan PLLC

(57) ABSTRACT

A method, non-transitory computer readable medium, and productivity assessment computing device that identifies entities present in frames of a video. Entity movement across the frames is plotted to obtain a trajectory of the entities. Interactions of one or more of the entities in each of the frames are identified. A unique sequence encoding is generated for subtasks performed by each of the entities. One of the subtasks is classified as a waste subtask based on one or more of the interactions corresponding to the one of the subtasks and the trajectory and a type of each of the entities associated with the interactions. The sequence encodings of the one of the subtasks are correlated with a number of frames per second of the video to determine waste duration value(s) for a task and the waste duration value(s) are output.

21 Claims, 3 Drawing Sheets

(51) Int. Cl.
*G06Q 50/04* (2012.01)
*G06K 9/00* (2006.01)
*G06T 7/246* (2017.01)

(52) U.S. Cl.
CPC ... *G06K 9/00771* (2013.01); *G06Q 10/06395* (2013.01); *G06Q 50/04* (2013.01); *G06T 7/248* (2017.01); *G06T 2207/30241* (2013.01); *Y02P 90/30* (2015.11)

(58) Field of Classification Search
USPC .............................................. 705/7.11–7.42
See application file for complete search history.

(56) References Cited

U.S. PATENT DOCUMENTS

| | | | | |
|---|---|---|---|---|
| 6,236,736 B1* | 5/2001 | Crabtree | ............... | G01S 3/7865 235/383 |
| 7,272,461 B2* | 9/2007 | Yoshikawa | ...... | G06Q 10/06398 348/143 |
| 7,543,744 B2* | 6/2009 | Hart | ........................ | G06Q 10/06 235/385 |
| 7,664,292 B2* | 2/2010 | van den Bergen | ............... | G06K 9/00771 348/152 |
| 7,864,980 B2* | 1/2011 | Evans | ................ | G06K 9/00771 348/154 |
| 8,253,792 B2* | 8/2012 | Wells | .................... | H04N 7/181 348/152 |
| 8,364,504 B1* | 1/2013 | Bleser | .................... | G06F 19/326 705/3 |
| 8,364,509 B1* | 1/2013 | Marr | .................. | G06Q 10/0639 705/320 |
| 8,548,203 B2* | 10/2013 | Bobbitt | .............. | G06K 9/00771 382/107 |
| 8,589,114 B2* | 11/2013 | Papadourakis | ........ | A63B 69/00 473/223 |
| 8,620,846 B2 | 12/2013 | Falchuk et al. | | |
| 8,694,352 B1* | 4/2014 | Hawkins | ................ | G06Q 30/02 705/7.15 |
| 9,158,995 B2* | 10/2015 | Rodriguez-Serrano | ................ | G06K 9/6217 |
| 9,257,150 B2* | 2/2016 | Hurst | ..................... | G11B 27/34 |
| 9,342,806 B2* | 5/2016 | Urban | ............ | G06Q 10/063114 |
| 9,566,004 B1* | 2/2017 | Radwin | | |
| 9,609,348 B2* | 3/2017 | Shi | .......... | H04N 19/52 |
| 2002/0114493 A1* | 8/2002 | McNitt | ................ | A61B 5/1124 382/107 |
| 2003/0053658 A1* | 3/2003 | Pavlidis | ............. | G06K 9/00335 382/103 |
| 2006/0104479 A1* | 5/2006 | Bonch-Osmolovskiy | ..... | G06K 9/00355 382/103 |
| 2007/0058040 A1* | 3/2007 | Zhang | ................ | G06K 9/00771 348/150 |
| 2008/0086290 A1* | 4/2008 | Wilson | ..................... | G06F 8/20 703/6 |
| 2009/0070163 A1* | 3/2009 | Angell | ................... | G06Q 10/04 705/7.26 |
| 2011/0128388 A1* | 6/2011 | Pai | ........................ | G01B 11/03 348/187 |
| 2011/0215911 A1* | 9/2011 | Cassels | ................... | G01K 7/01 340/10.4 |
| 2011/0302003 A1* | 12/2011 | Shirish | .............. | G06Q 10/0639 705/7.38 |
| 2011/0320240 A1 | 12/2011 | Flores et al. | | |
| 2013/0110565 A1* | 5/2013 | Means, Jr. | ............. | G06Q 10/06 705/7.11 |
| 2013/0275187 A1* | 10/2013 | Patel | ................ | G06Q 10/06398 705/7.42 |
| 2013/0308922 A1* | 11/2013 | Sano | .................. | H04N 21/4316 386/245 |
| 2014/0032280 A1* | 1/2014 | Etchegoyen | ..... | G06Q 10/06398 705/7.42 |
| 2014/0278629 A1* | 9/2014 | Stephenson | ........ | G06Q 10/1091 705/7.13 |

OTHER PUBLICATIONS

Han, SangUk, and SangHyun Lee. "A vision-based motion capture and recognition framework for behavior-based safety management." Automation in Construction 35 (2013): 131-141.*

Vijayanarasimhan, Sudheendra, and Kristen Grauman. "Active frame selection for label propagation in videos." European Conference on Computer Vision. Springer, Berlin, Heidelberg, 2012.*

* cited by examiner

METHODS FOR DETERMINING MANUFACTURING WASTE TO OPTIMIZE PRODUCTIVITY AND DEVICES THEREOF

This application claims the benefit of Indian Patent Application Serial No. 690/CHE/2015 filed Feb. 12, 2015, which is hereby incorporated by reference in its entirety.

FIELD

This technology relates to assessing manufacturing productivity and more particularly to methods and devices for analyzing video data to identify waste in a manufacturing environment.

BACKGROUND

Manufacturing enterprises are generally focused on producing the highest quality products at the quickest rate in order to meet demand. Accordingly, many enterprises analyze productivity to identify inefficiencies and potential manufacturing process improvements. However, available methods for analyzing productivity are ineffective, highly susceptible to inaccuracies, and lead to false or limited conclusions regarding optimizing productivity.

Manufacturers have implemented techniques such as timing workers using stopwatches and other work sampling techniques. These sampling techniques are labor-intensive, inefficient, and inaccurate due to the limited number of samples, among other deficiencies. Other techniques involve monitoring productivity using sensors or video recording devices to provide data. However, available software solutions do not effectively analyze the data in order to generate useful information regarding waste that can be used to optimize productivity. Instead, these solutions have limited utility, require significant human intervention, and are incapable of facilitating conclusions that effectively lead to relatively lean production.

SUMMARY

A method for analyzing video data to determine manufacturing waste to optimize productivity includes identifying, by a productivity assessment computing device, a plurality of entities present in each of a plurality of obtained frames of a video and a type of each of the entities. Movement of each of the entities across at least a subset of the frames is plotted, by the productivity assessment computing device, to obtain a trajectory of each of the entities. A plurality of interactions of one or more of the entities in each of the frames is identified by the productivity assessment computing device. A unique sequence encoding for each of a plurality of subtasks performed by each of the entities is generated by the productivity assessment computing device. The subtasks are identified based on the interactions and a sequence of at least a subset of the subtasks is associated with at least one task. At least one of the subset of subtasks is classified, by the productivity assessment computing device, as a waste subtask of the task based on one or more of the interactions corresponding to the one of the subset of subtasks and the trajectory and the type of each of the entities associated with the one or more of the interactions. The sequence encodings of the one of the subset of subtasks are correlated, by the productivity assessment computing device, with a number of frames per second of the video to determine at least one waste duration value for the task, and the waste duration value is output.

A non-transitory computer readable medium having stored thereon instructions for analyzing video data to determine manufacturing waste to optimize productivity comprising executable code which when executed by a processor, causes the processor to perform steps including identifying a plurality of entities present in each of a plurality of obtained frames of a video and a type of each of the entities. Movement of each of the entities across at least a subset of the frames is plotted to obtain a trajectory of each of the entities. A plurality of interactions of one or more of the entities in each of the frames is identified. A unique sequence encoding for each of a plurality of subtasks performed by each of the entities is generated. The subtasks are identified based on the interactions and a sequence of at least a subset of the subtasks is associated with at least one task. At least one of the subset of subtasks is classified as a waste subtask of the task based on one or more of the interactions corresponding to the one of the subset of subtasks and the trajectory and the type of each of the entities associated with the one or more of the interactions. The sequence encodings of the one of the subset of subtasks are correlated with a number of frames per second of the video to determine at least one waste duration value for the task, and the waste duration value is output.

A productivity assessment computing device including a processor and a memory coupled to the processor which is configured to be capable of executing programmed instructions comprising and stored in the memory to identify a plurality of entities present in each of a plurality of obtained frames of a video and a type of each of the entities. Movement of each of the entities across at least a subset of the frames is plotted to obtain a trajectory of each of the entities. A plurality of interactions of one or more of the entities in each of the frames is identified. A unique sequence encoding for each of a plurality of subtasks performed by each of the entities is generated. The subtasks are identified based on the interactions and a sequence of at least a subset of the subtasks is associated with at least one task. At least one of the subset of subtasks is classified as a waste subtask of the task based on one or more of the interactions corresponding to the one of the subset of subtasks and the trajectory and the type of each of the entities associated with the one or more of the interactions. The sequence encodings of the one of the subset of subtasks are correlated with a number of frames per second of the video to determine at least one waste duration value for the task, and the waste duration value is output.

This technology provides a number of advantages including providing methods, non-transitory computer readable media, and devices that more effectively determine data about manufacturing waste to optimize productivity. With this technology, manufacturing enterprises can automatically analyze video data to more effectively determine motion, transportation, and waiting waste associated with various manufacturing tasks. Using video data, a floor plan, and training data as input, enterprises can advantageously obtain information regarding worker movement patterns, average time required to perform a task or subtask, repetitive tasks, most or least productive hours, and the pace or rate of machine operators, for example, which can be analyzed and used with the determined waste(s) to optimize productivity.

DETAILED DESCRIPTION

Figure 1:
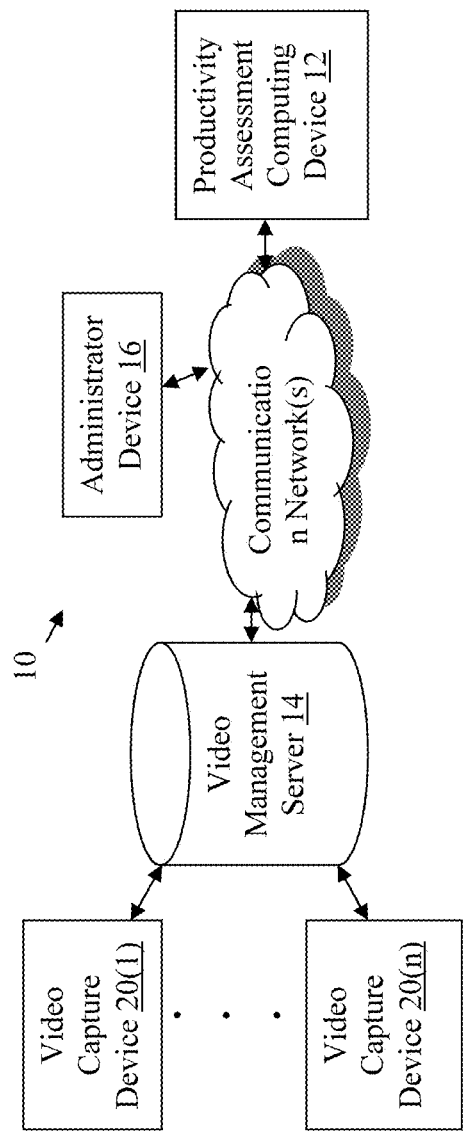
FIG. 1 a block diagram of a network environment with an exemplary productivity assessment computing device.

A network environment 10 including an exemplary productivity assessment computing device 12 coupled to a video management server 16 and an administrator device 16 by communication network(s) 18 is illustrated in FIG. 1. The network environment 10 also includes a plurality of video capture devices 20(1)-20(n) that are coupled to the video management server 14, such as by another communication network (not shown). In other examples, this network environment 10 can include other numbers and types of systems, devices, components, and/or elements in other configurations. This technology provides a number of advantages including methods, non-transitory computer readable media, and devices that facilitate optimizing manufacturing productivity by analyzing video data to determine manufacturing waste.

Figure 2:
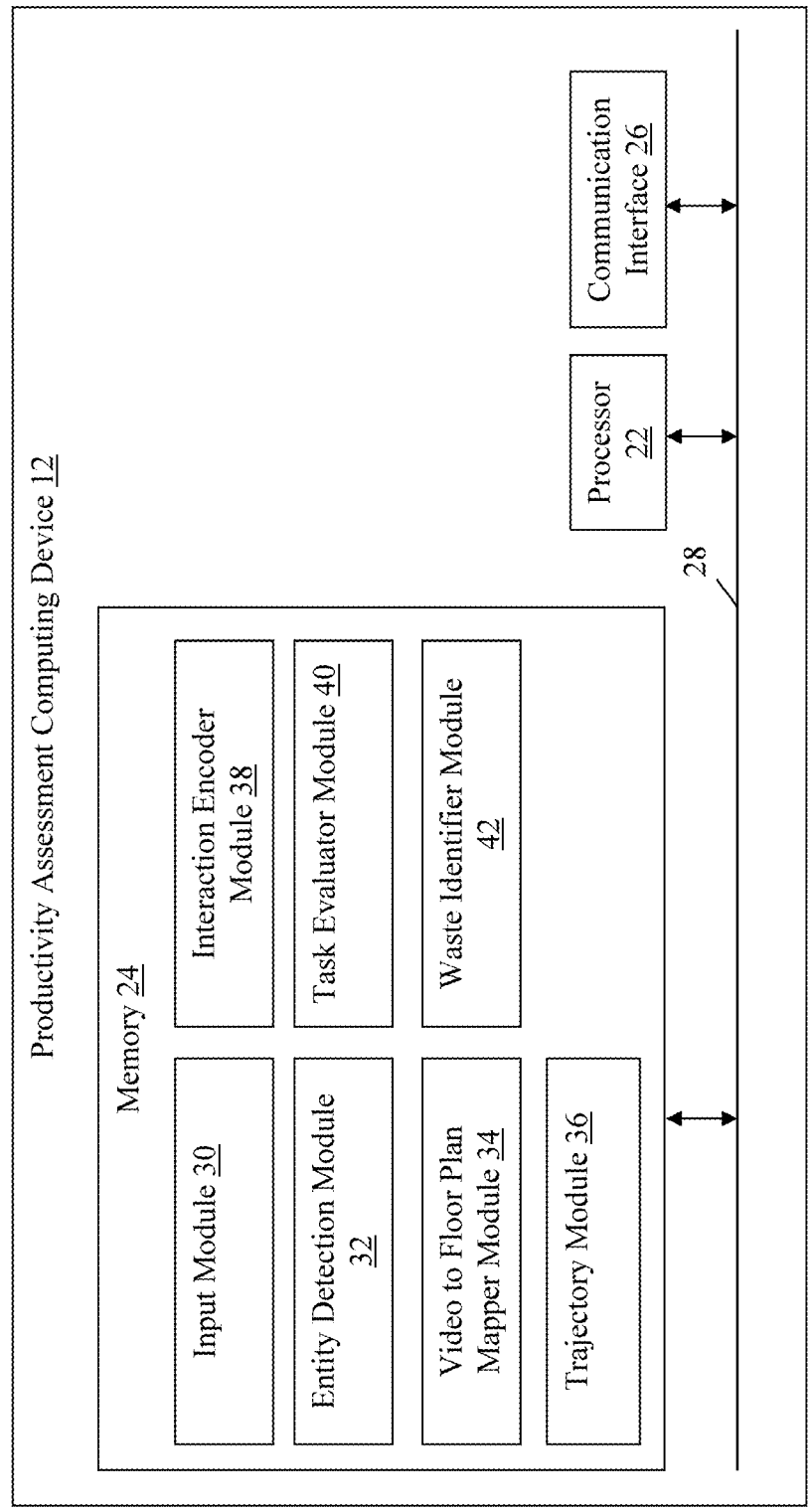
FIG. 2 is a block diagram of the exemplary productivity assessment computing device.

Referring to FIG. 2, a block diagram of the exemplary productivity assessment computing device 12 is illustrated. The productivity assessment computing device 12 generally analyzes video data obtained from the video management server 14 in response to queries from the administrator device 16, as described and illustrated in more detail later. In other examples, the productivity assessment computing device 12 can be integrated with the video management server 14, and other configurations of the various devices in the network environment 10 can also be used.

In this particular example, the productivity assessment computing device 12 includes a processor 22, a memory 24, and a communication interface 26, which are all coupled together by a bus 28 or other communication link, although the productivity assessment computing device 12 can have other types and numbers of components or other elements. The processor 22 of the productivity assessment computing device 12 executes a program of stored instructions for one or more aspects of this technology, as described and illustrated by way of the embodiments herein, although the processor 22 could execute other numbers and types of programmed instructions. The processor 22 in the productivity assessment computing device 12 may include one or more central processing units or general purpose processors with one or more processing cores, for example.

The memory 24 of the productivity assessment computing device 12 may include any of various forms of read only memory (ROM), random access memory (RAM), Flash memory, solid state drives, non-volatile, or volatile memory, or the like, or a combination of such devices for example. In this example, the memory 24 further includes an input module 30, an entity detection module 32, a video to floor plan mapper module 34, a trajectory module 36, an interaction encoder module 38, a task evaluator module 40 and a waste identifier module 42, although other numbers and types of modules and applications can also be included in the memory 24 and one or more of the input module 30, entity detection module 32, video to floor plan mapper module 34, trajectory module 36, interaction encoder module 38, task evaluator module 40, or waste identifier module 42 can be stored elsewhere in the network environment 10.

The input module 30 obtains video data, a floor plan for a manufacturing facility, and classifiers. The video data in this particular example is obtained from the video management server 14 and can be in the form of a plurality of frames of video initially obtained by the video capture devices 20(1)-20(n). Optionally, the input module 30 can directly obtain live video feeds from the video capture devices 20(1)-20(n) via video management applications executed by the video management server 14. The input module 30 in this example is further configured to obtain a floor plan or site map for the area being monitored along with the positions of the video capture devices 20(1)-20(n), which can be used to map the video data as described and illustrated in more detail later. The floor plan and positions of the video capture devices 20(1)-20(n) at manufacturing facility can be provided by a user of the administrator device 16 via an interface provided by the input module 30, for example, although other methods of obtaining the floor plan or the positions of the video capture devices 20(1)-20(n) can also be used.

The classifiers obtained by the input module 30 include training images of various entities associated with the manufacturing facility and training videos of various tasks performed by or with the entities at the manufacturing facility. Accordingly, the classifiers can be used for purposes of entity and task detection, as described and illustrated in more detail later. The classifiers can be obtained from the video management server 14 based on a pre-analysis portion of the video data, optionally with input from a user of the administrator device 16, for example, although other methods for obtaining classifiers and training data can also be used.

The entity detection module 32 analyzes the video data obtained by the input module 30 to identify the entities present in each of the frames of the video data. Entities include humans, machines, and materials in the examples described and illustrated herein, although other entity types can also be used. In order to identify the entities in each frame of the video data, the entity detection module 32 uses the classifiers obtained by the input module 30. In addition to identifying the entities, the entity detection module 32 further determines entity data including features (e.g., color, size, or shape) and positions (e.g., coordinates) of the identified entities and stores the entity data in the memory 24 as associated with an indication of the corresponding video frame.

The video to floor plan mapper module 34 uses the floor plan and positions of the video capture devices 20(1)-20(n) obtained by the input module 30 to generate a mapping based on positions of stationary objects, such as the machine entities identified by the entity detection module 32. The mapping may be used to map or correlate the coordinates in video to corresponding floor plan The mapping may be used to determine the position of mobile entities such as materials and humans, for example, in the frames of the video data provided by the video capture device 20(1)-20(n) that are disposed at various locations at the manufacturing facility.

The trajectory module 36 determines the path of the mobile entities, such as the materials and the humans, across adjacent frames of the video data. The trajectory module 36 can correlate the entity data including the features and position of entities, as obtained and stored in the memory 24 by the entity detection module 32, in adjacent frames to plot the trajectory or motion path of various entities across the frames of the obtained video data. The entity detection module 32 can determine the positions based on a coordinate system associated with the mapping generated by the video to floor plan mapper module 34, for example.

Other information such as continuity patterns (e.g., limits on distance an object can move between consecutive frames) can also be used to determine the trajectory of the entities and other methods of determining the entity trajectories and the entities present in each frame and associated features and positions can also be used. In this example, the trajectory module 36 further stores trajectory data including the coordinates representing the motion path for each of the entities across the frames in the video data in the memory 24.

The interaction encoder module 38 identifies interactions between entities and corresponding subtasks (e.g., a human walking with a material between a materials departments and a machine) associated with various tasks (e.g., pressing a material into sheets), and generates an encoding for each of the subtasks. In one example, the interaction encoder module 38 identifies, for each entity in each frame, entity adjacency data including an indication of all other entities within a predefined vicinity of the entity based on the positions in the video frames identified and stored by the entity detection module 32 using the mapping generated by the video to floor plan mapper module 34, as described and illustrated earlier. With the adjacency data, the interaction encoder module 38 identifies, for each entity in each frame, whether the entity is connected to any of the adjacent entities, such as based on overlapping pixels in the video data, for example.

Based on the connectivity data, the interaction encoder module 38 identifies interaction sequences across consecutive video frames, which correspond with subtasks. The interaction encoder module 38 further generates an encoding including a label for each of the identified subtasks. Additionally, the interaction encoder module 38 generates an encoding for subtasks in which no entities are determined to be interacting. The encoding is unique and indicates a number of frames for which the subtask occurs. The interaction encoder module 38 then stores processed interaction data regarding the various subtasks including any interacting entities and the corresponding encoding, for example, in the memory 24. Optionally, the processed interaction data also includes an indication of any subtasks including one or more of the same connected entities, which can be used for purposes of task identification, as described and illustrated in more detail later.

For example, if a human is determined by the interaction encoder module 38 to be walking toward a hammer (a machine entity) for two frames, the interaction encoder module 38 can generate an encoding such as "AA" for the subtask, representing that the subtask spanned two frames. In this example, the interaction encoder module 38 also determines that the human picked up the hammer and is walking with the hammer toward a material for three frames and generates the encoding "BBB" for the subtasks. Finally, the interaction encoder module 38 determines that the human is interacting with the hammer to hammer a material for five frames and generates an encoding "CCCCC" for the subtask. Optionally, the interaction encoder module 38 can store an indication that at least the "BBB" and "CCCCC" subtasks include the same connected entities (the human and the hammer), and therefore may correspond to the same task.

The task evaluator module 40 correlates the processed interaction data stored by the interaction encoder module 38, the trajectory data generated by the trajectory module 36, and the task classifiers obtained by the input module 30 to identify tasks performed in the obtained video data and the subtasks associated with the identified tasks. Accordingly, the task evaluator module 40 can compare the video data corresponding to various permutations of the subtasks and the trajectories of the associated entities with the classifiers to identify likely matches which correspond with a set of subtasks that together comprise a task. Additionally, the task evaluator module 40 in this example determines, and stores in the memory 24, timing data including an amount of time associated with each subtask based on a correlation of the number of frames in which the subtask occurs with the number of frames per second of the video data.

In the example described and illustrated earlier, the human walking toward a hammer at a trajectory corresponding to specified coordinates, then walking with the hammer toward a material at another trajectory corresponding to other specified coordinates, and then hammering the material, can be compared to a classifier to determine that the three subtasks correspond with the task of hammering the material. In this example, the three subtasks are identified as associated with a task of hammering the material, and the identified task is therefore assigned a unique encoding of "AABBBCCCCC".

The unique task encoding in this example includes the encodings for the three subtasks and represents the order of occurrence of the subtasks and the number of frames in which each of the subtasks occurred. Accordingly, assuming the video data is in the format of one frame per second, the task evaluator module 40 will determine in this particular example that the subtasks took two seconds, three seconds, and five seconds, respectively, and that the task took ten seconds.

The waste identifier module 42 classifies at least one of the subtasks for a task as a waste subtask using the trajectory data, the processed interaction data, and the timing data, and outputs a waste duration value associated with the waste subtask using the processed interaction data stored by the interaction encoder module 38 and the timing data stored by the task evaluator module 40. In one example, a waste subtasks can represent a transportation waste, a waiting waste, or a motion waste, as described and illustrated in more detail later, although subtasks can also be classified as other types and numbers of waste subtasks.

Accordingly, in the example described and illustrated earlier, the subtask of the human walking to pick up the hammer is classified by the waste identifier module 42 as a motion waste since the human is not interacting with a material or machine entity and has a trajectory that indicates movement from one location to another location. Since the video data is in a format of one frame per second and the subtask of the human walking to pick up the hammer spanned two frames, the waste identifier module 42 determines from the timing data that the subtask took two seconds, which corresponds with the waste duration value for the task.

The communication interface 26 of the productivity assessment computing device 12 in this example operatively couples and communicates between the productivity assessment computing device 12, the administrator device 16, and the video management server 14 over communication network(s) 18, although other types and numbers of communication networks or systems with other types and numbers of connections and configurations to other devices and elements can also be used.

By way of example only, the communication network(s) 18 can use TCP/IP over Ethernet and industry-standard protocols, including NFS, CIFS, SOAP, XML, LDAP, and SNMP, although other types and numbers of communication networks, can be used. The communication network(s) 18 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

In this particular example, the video capture devices 20(1)-20(n) can be video cameras (e.g., IP cameras) disposed at various locations throughout the manufacturing facility and configured to record video data associated with activity occurring at the manufacturing facility. Accordingly, the video capture devices 20(1)-20(n) each include a processor, a memory, a communication interface, and an image sensor coupled together by a bus or other communication link. The video capture devices 20(1)-20(n) can be part of a closed-circuit television (CCTV) system employed by a manufacturing facility for monitoring or surveillance purposes, for example. Accordingly, this technology can advantageously leverage significant infrastructure already in existence at many manufacturing facilities.

The video management server 14 stores video data obtained from the video capture devices 20(1)-20(n) in this example and can be a digital video recorder or other network attached storage device. Accordingly, the video management server 14 includes a processor, a memory, and a communication interface coupled together by a bus or other communication link. The video management server 14 can communicate with the video capture devices 20(1)-20(n) via a point to point (P2P), point to multipoint, or mesh wireless network or a direct wired connection, for example, although any other type of coupling of the video management server 14 to the video capture devices 20(1)-20(n) can also be used. Additionally, the video management server 14 can be located onsite at the manufacturing facility or offsite at a third party location, for example.

The administrator device 16 in this example includes a processor, a memory, a communication interface, an input device, and a display device, which are coupled together by a bus or other communication link, although the administrator device 16 can have other types and numbers of components or other elements. The administrator device 16 may communicate with the productivity assessment computing device 12 to submit queries regarding identified waste duration values and other indicators of productivity determined by the productivity assessment computing devices 12, as described and illustrated in more detail later.

Although examples of the productivity assessment computing device 12, video management server 14, administrator device 16, and video capture devices 20(1)-20(n) are described herein, it is to be understood that the devices and systems of the examples described herein are for exemplary purposes, as many variations of the specific hardware and software used to implement the examples are possible, as will be appreciated by those skilled in the relevant art(s). In addition, two or more computing systems or devices can be substituted for any one of the systems in any embodiment of the examples.

The examples also may be embodied as one or more non-transitory computer readable media having instructions stored thereon for one or more aspects of the present technology, as described and illustrated by way of the examples herein, which when executed by a processor, cause the processor to carry out the steps necessary to implement the methods of this technology, as described and illustrated with the examples herein.

Figure 3:
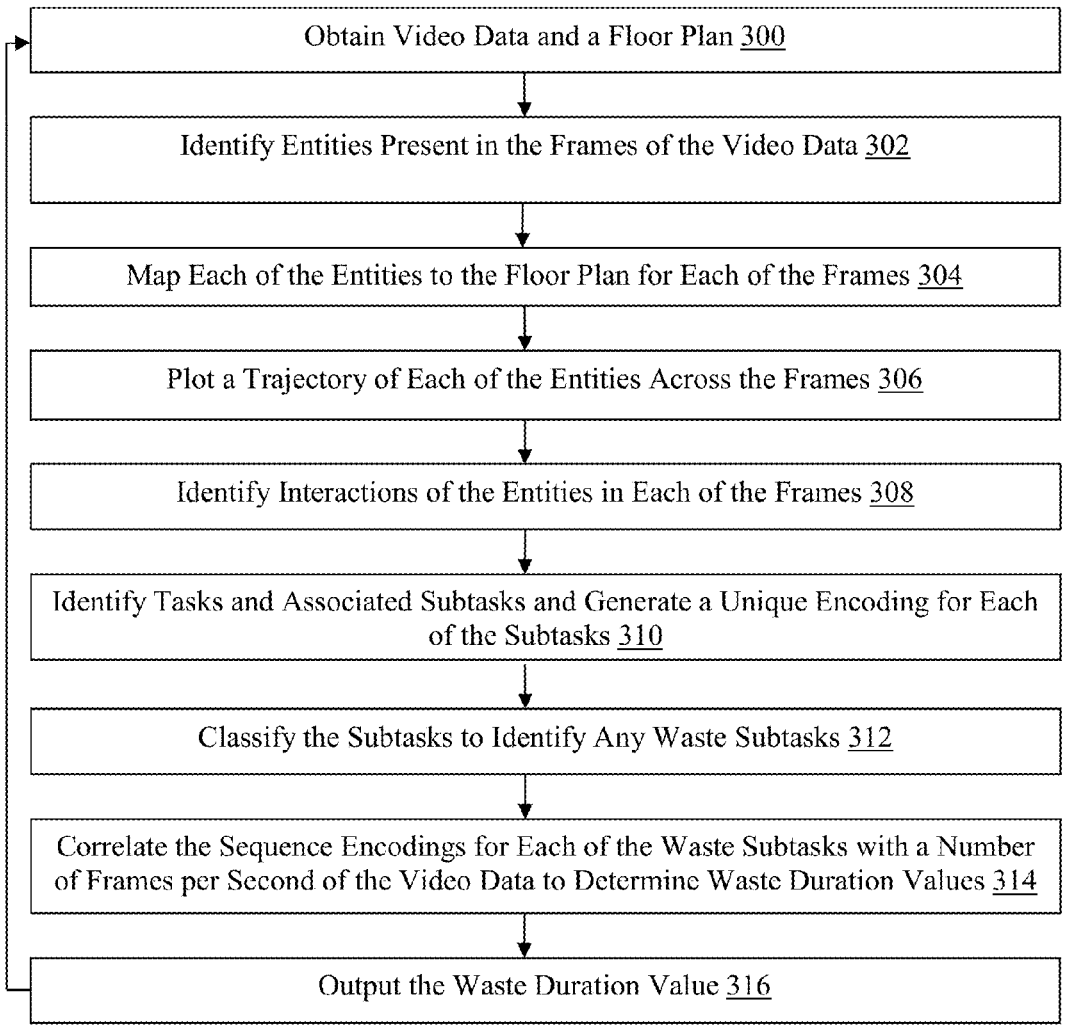
FIG. 3 is a flowchart of an exemplary method for analyzing video data to determine manufacturing waste with the exemplary productivity assessment computing device.

Referring more specifically to FIG. 3, an exemplary method for analyzing video data to determine manufacturing waste with the productivity assessment computing device 12 is illustrated. In step 300 in this particular example, the productivity assessment computing device 12 obtains video data for a specified time period and a floor plan for a manufacturing facility to be analyzed. The video data can be obtained from the video management server 14 and initially captured by video capture devices 20(1)-20(n), for example. Data on the floor plan can be submitted by a user of the administrator device 16 via a provided interface.

Optionally, the productivity assessment computing device 12 also obtains training classifiers including still images of entities (e.g., humans, machines, or materials) that can be found in the manufacturing facility and videos of tasks performed in the production of goods at the manufacturing facility. The still image classifiers are used by the productivity assessment computing device 12 to identify entities in the obtained video data, as described and illustrated in more detail later.

The video classifiers are used to identify tasks performed by or with the entities identified in the obtained video data, also as described and illustrated in more detail later. The classifiers can be trained on a portion of the video data based on input from a user of the administrator device 16, for example. Alternatively, the classifiers can be trained separate from the video data, and other methods of training the classifiers can also be used. In this example, the productivity assessment computing device 12 stores the video data, floor plan, and classifiers in the memory 24.

In step 302, the productivity assessment computing device 12 identifies entities present in each frame of the obtained video data and a type of each of the entities. Entities can include humans, machines, and materials, although other types and/or numbers of entity types can be used. An entity can be identified based on a match of a portion of one of the frames with one of the still image classifiers stored in the memory 24, for example. Optionally, the productivity assessment computing device 12 can also use image processing techniques, such as background subtraction, human detection, and hogg transforms, for example, in order to more effectively identify each of the entities. Additionally, features (e.g., color, size, or shape) of the entities can be determined, used in the detection of the entities, and stored in the memory 24 as associated with an indication of the corresponding video frame.

In step 304, the productivity assessment computing device 12 maps each of the identified entities to the obtained floor plan data for each of the frames. In examples in which video data is obtained from a plurality of video capture devices 20(1)-20(n), the productivity assessment computing device 12 can correlate positions of stationary entities or other objects across corresponding frames in the video data obtained from different ones of the video capture devices 20(1)-20(n) to generate a mapping. Optionally, techniques such as perspective transformation, homography, and closest quadrilateral can be used to improve the accuracy of the generated mapping An exemplary method for generating the mapping is described and illustrated in more detail in India Patent Application No. 420/CHE/2015, which is incorporated by reference herein in its entirety. Subsequent to generating the mapping, the productivity assessment computing device 12 can determine a position of each of the entities in each of the frames using a common coordinate system based on the map, described earlier. The positions of the entities can also be stored in the memory 24 as associated with an indication of the corresponding video frame.

In step 306, the productivity assessment computing device 12 plots a trajectory of each of the entities across at least a subset of the frames of the video data. In this example, the movement of mobile entities across adjacent frames of the video data can be determined by correlating the entity data including the features and position of the entities in consecutive frames. The motion path can then be plotted using coordinates of the generated mapping. Other methods of plotting the trajectories can also be used. The trajectory data including the coordinates representing the motion path for each of the entities across the frames in the video data can be stored in the memory 24.

In step 308, the productivity assessment computing device 12 identifies connections or interactions of each of the entities in each of the frames based on the trajectories, a determined physical adjacency, and a number of overlapping pixels, for example, although other parameters can also be used to identify entity interactions. The physical adjacency of various entities in a frame can be determined based on the positions determined and stored using the generated mapping in step 304. Accordingly, the productivity assessment computing device 12 in this example identifies, for each entity in each frame, entity adjacency data including an indication of all other entities within a predefined vicinity of the entity based on the positions in the video frames identified and stored using the map. With the adjacency data, the productivity assessment computing device 12 identifies, for each entity in each frame, whether the entity is connected to any of the adjacent entities, such as based on overlapping pixels in the video data, for example.

In one example, two human entities H1 and H2, two materials M1, and M2, and two machines T1 and T2 are identified in step 302 as present in a frame of the video data. In step 308 in this example, T1, T2, and M1 are determined to be available within a certain radius of H1. Additionally, only M1 is determined to have overlapping pixels with H1 within a certain threshold. Accordingly, in this example, the productivity assessment computing device 12 determines that only H1 and M1 are interacting in the frame.

In step 310, the productivity assessment computing device 12 identifies tasks and associated subtasks and generates a unique encoding for each of the subtasks, although other types and/or other numbers of tasks or other assignments could be encoded. In this example, the productivity assessment computing device 12 identifies interaction sequences across consecutive video frames, which correspond with subtasks. The productivity assessment computing device 12 further generates an encoding including a label for each of the identified subtasks.

Additionally, the productivity assessment computing device 12 generates an encoding for subtasks in which no entities are determined to be interacting. The generated encodings are unique and indicate a number of frames for which a subtask occurs. Processed interaction data regarding the various subtasks including any interacting entities and the corresponding encoding, for example, can be stored in the memory 24. Optionally, the processed interaction data also includes an indication of any subtasks including one or more of the same connected entities.

Based on the generated processed interaction data, the determined trajectory data, and the obtained task classifiers, the productivity assessment computing device 12 identifies tasks performed in the obtained video data and the subtasks associated with the identified tasks. In one example, the productivity assessment computing device 12 compares the video data corresponding to various permutations of the subtasks and the trajectories of the associated entities with the classifiers to identify a set of the subtasks that are associated with a same task.

In one example, the productivity assessment computing device 12 identifies four subtasks associated with a task of pressing a material into a sheet. In the first subtask, a human H1 walks over to a materials department. In the second subtask, the human H1 picks up material M1 and walks to a press machine P1. During the first and second subtasks, a human H2 is waiting near the press machine P1 for the material M1 in a third subtask. In a fourth subtask, the material M1 is placed on the press machine P1 and the humans H1 and H2 operate the press machine P1. In this example, the productivity assessment computing device 12 generates unique sequence encodings of "AAAA", "BBBB", "CCCCCCCC", and "DDDD" for the four subtasks, respectively.

In step 312, the productivity assessment computing device 12 classifies one or more of the subtasks identified in step 310 as waste subtasks using the trajectory data, the processed interaction data, and the timing data. A subtask can be classified as transportation waste when the processed interaction data indicates that a material entity is interacting with a machine or human entity and the trajectory data indicates that the material entity is moving from one location to another location. A subtask can be classified as a waiting waste when the processed interaction data indicates that a human entity is not interacting with any other entity and the trajectory data indicates that the human entity is not moving or is idle. Additionally, a subtask can be classified as a motion waste when the processed interaction data indicates that a human is not interacting with a material or machine entity and the trajectory data indicates that the human is moving from one location to another location.

In the example described and illustrated earlier, the first subtask associated with the sequence encoding "AAAA" is classified as a motion waste subtask because the human H1 is walking and therefore only involves a displacement of the human H1 from on location to another without any interaction with a machine or material. Additionally, the second subtask associated with the sequence encoding "BBBB" is classified as a transportation waste subtask because the human H1 and the material M1 are interacting but are undergoing a displacement in position. The third subtask associated with the sequence encoding "CCCCCCCC" is classified as a waiting waste subtask because the human H2 does not experience any change in position and is not interacting with any material or machine. However, the subtask associated with the "DDDDDD" sequence encoding is a productive subtask, and not a waste subtask in this example. Other types of waste and productive subtasks can also be used.

In step 314, the productivity assessment computing device 12 correlates the sequence encodings for each classified waste subtask with a number of frames per second of the video data to determine corresponding waste duration values associated with the task. According, in the example described and illustrated earlier, assuming the video data has an associated frame rate of one frame per second, the task of pressing a material into a sheet would be associated with four second motion and four second transportation waste duration values for a total waste duration attributable to human H1 of eight seconds. Additionally, the task of pressing a material into a sheet would be associated with an eight second waiting waste duration value attributable to the human H2. Accordingly, the total waste duration associated with the task of pressing a material into a sheet in this example is 16 seconds.

In step 316, the productivity assessment computing device 12 outputs the waste duration values determined in step 314. The waste duration values can be output to the memory 24 or to the administrator device 16 in response to a query received from the administrator device 16 via a provided interface, for example, although other methods of outputting the waste duration values can also be used. The waste duration values can provide significant useful insight. For example, with reference to the example described and illustrate earlier, an administrator might determine that the human H2 could be engaged in a productive task during the eight seconds of waiting waste attributable to the human H2 during the task of pressing a material into a sheet.

In other examples, additional data can also be generated and output by the productivity assessment computing device 12. Referring again to the example described and illustrated earlier, the administrator might determine that the motion waste of human H1 is excessive and may submit a query to the productivity assessment computing device 12 to identify the paths taken by human H1, or corresponding humans during various performances of the task of pressing a material into a sheet.

In response, the productivity assessment computing device 12 can determine frequently followed paths in the subtasks classified as waste subtasks for the task of pressing a material into a sheet based on the trajectory data generated in step 306. Based on the output indication of the frequently followed paths, an administrator can determine that another machine can be moved to make the path between H1 and the material M1 more direct or the material M1 can be located closer to the press machine P1, for example. In yet other examples, the productivity assessment computing device 12 can determine worker movement patterns, average time required to perform a task or subtask, repetitive tasks, most or least productive hours, or the pace or rate of machine operators, for example, which can also be used to optimize productivity.

Accordingly, with this technology, manufacturing productivity can automatically be analyzed to identify waste based on video data obtained at a manufacturing facility. Using the video data, training information, a floor plan, and locations of the devices that captured the video data, this technology advantageously facilitates automatically determining motion, transportation, and waiting waste for manufacturing tasks performed at the facility. With the output waste information, and other contextual information regarding waste subtasks, such as frequently followed paths, administrators can more effectively optimize productivity at the facility.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for automatically processing and analyzing video data to facilitate more effective and efficient identification of waste subtasks included therein, the method implemented by one or more productivity assessment computing devices and comprising:

obtaining video data captured by one or more video capture devices, the video data comprising a plurality of frames of a video, and automatically analyzing the video data to identify a plurality of entities present in each of the frames and a type of each of the entities based on a correlation of the video data with a plurality of stored classifiers;

plotting movement of each of the entities across at least a subset of the frames to determine a trajectory of each of the entities based on a stored digital floor plan, wherein the subset of the frames comprises consecutive ones of the frames;

generating entity adjacency data for each of the entities based on a position of the entities in each of the frames and identifying a plurality of interactions of one or more of the entities in each of the frames based on the entity adjacency data;

generating a unique sequence encoding for each of a plurality of subtasks performed by each of the entities, wherein the subtasks are identified based on the interactions and a sequence of at least a subset of the subtasks is associated with at least one task;

classifying at least one of the subset of the subtasks as a waste subtask of the task based on one or more of the interactions corresponding to the one of the subset of the subtasks and the determined trajectory and the type of each of the entities associated with the one or more of the interactions;

correlating the sequence encodings of the one of the subset of subtasks with a number of frames per second of the video data to determine at least one waste duration value for the task; and outputting an indication of the one of the subset of the subtasks classified as a waste subtask and the waste duration value.

2. The method as set forth in claim 1, further comprising identifying one or more features of each of the entities in each of the frames.

3. The method as set forth in claim 1, wherein the subset of the subtasks is associated with the task based on a correlation with the classifiers and the classifiers comprise training images of the entities and training videos of the tasks.

4. The method as set forth in claim 1, wherein the waste duration value is for transportation waste and comprises a duration that a material one of the entities is interacting with a machine one of the entities or a human one of the entities and is moving from one location to another location.

5. The method as set forth in claim 1, wherein the waste duration value is for a waiting waste and comprises a duration that a human one of the entities is idle and not interacting with any other of the entities.

6. The method as set forth in claim 1, wherein the waste duration value is for a motion waste and comprises a duration that a human one of the entities is not interacting with a material one of the entities or a machine one of the entities and is moving from one location to another location.

7. The method as set forth in claim 6, further comprising determining one or more frequently followed paths based on the trajectories and outputting an indication of the frequently followed paths, wherein the frequently followed paths correspond with the one of the subset of subtasks classified as a waste subtask.

8. A productivity assessment computing device comprising memory comprising programmed instructions stored thereon and at least one processor coupled to the memory, which is configured to be capable of executing the stored programmed instructions to:

obtain video data captured by one or more video capture devices, the video data comprising a plurality of frames, and automatically analyze the video data to identify a plurality of entities present in each of the frames and a type of each of the entities based on a correlation of the video data with a plurality of stored classifiers;

plot movement of each of the entities across at least a subset of the frames to determine a trajectory of each of the entities based on a stored digital floor plan, wherein the subset of the frames comprises consecutive ones of the frames;

generate entity adjacency data for each of the entities based on a position of the entities in each of the frames and identify a plurality of interactions of one or more of the entities in each of the frames based on the entity adjacency data;

generate a unique sequence encoding for each of a plurality of subtasks performed by each of the entities, wherein the subtasks are identified based on the interactions and a sequence of at least a subset of the subtasks is associated with at least one task;

classify at least one of the subset of the subtasks as a waste subtask of the task based on one or more of the interactions corresponding to the one of the subset of the subtasks and the determined trajectory and the type of each of the entities associated with the one or more of the interactions;

correlate the sequence encodings of the one of the subset of subtasks with a number of frames per second of the video data to determine at least one waste duration value for the task; and output an indication of the one of the subset of the subtasks classified as a waste subtask and the waste duration value.

9. The productivity assessment computing device as set forth in claim 8, wherein the processor is further configured to be capable of executing the stored programmed instruction to identify one or more features of each of the entities in each of the frames.

10. The productivity assessment computing device as set forth in claim 8, wherein the subset of the subtasks is associated with the task based on a correlation with the classifiers and the classifiers comprise training images of the entities and training videos of the tasks.

11. The productivity assessment computing device as set forth in claim 8, wherein the waste duration value is for a transportation waste and comprises a duration that a material one of the entities is interacting with a machine one of the entities or a human one of the entities and is moving from one location to another location.

12. The productivity assessment computing device as set forth in claim 8, wherein the waste duration value is for a waiting waste and comprises a duration that a human one of the entities is idle and not interacting with any other of the entities.

13. The productivity assessment computing device as set forth in claim 8, wherein the waste duration value is for a motion waste and comprises a duration that a human one of the entities is not interacting with a material one of the entities or a machine one of the entities and is moving from one location to another location.

14. The productivity assessment computing device as set forth in claim 13, wherein the processor is further configured to be capable of executing the stored programmed instruction to determine one or more frequently followed paths based on the trajectories and output an indication of the frequently followed paths, wherein the frequently followed paths correspond with the one of the subset of subtasks classified as a waste subtask.

15. A non-transitory computer readable medium having stored thereon instructions for processing and analyzing video data to facilitate more effective and efficient identification of waste subtasks included therein comprising executable code, which when executed by at least one processor, causes the processor to:

obtain video data captured by one or more video capture devices, the video data comprising a plurality of frames, and automatically analyze the video data to identify a plurality of entities present in each of the frames and a type of each of the entities based on a correlation of the video data with a plurality of stored classifiers;

plot movement of each of the entities across at least a subset of the frames to determine a trajectory of each of the entities based on a stored digital floor plan, wherein the subset of the frames comprises consecutive ones of the frames;

generate entity adjacency data for each of the entities based on a position of the entities in each of the frames and identify a plurality of interactions of one or more of the entities in each of the frames based on the entity adjacency data;

generate a unique sequence encoding for each of a plurality of subtasks performed by each of the entities, wherein the subtasks are identified based on the interactions and a sequence of at least a subset of the subtasks is associated with at least one task;

classify at least one of the subset of the subtasks as a waste subtask of the task based on one or more of the interactions corresponding to the one of the subset of the subtasks and the determined trajectory and the type of each of the entities associated with the one or more of the interactions;

correlate the sequence encodings of the one of the subset of subtasks with a number of frames per second of the video data to determine at least one waste duration value for the task; and output an indication of the one of the subset of the subtasks classified as a waste subtask and the waste duration value.

16. The non-transitory computer readable medium as set forth in claim 15, wherein the executable code, when executed by the processor, further causes the processor to identify one or more features of each of the entities in each of the frames.

17. The non-transitory computer readable medium as set forth in claim 15, wherein the subset of the subtasks is associated with the task based on a correlation with the classifiers and the classifiers comprise training images of the entities and training videos of the tasks.

18. The non-transitory computer readable medium as set forth in claim 15, wherein the waste duration value is for a transportation waste and comprises a duration that a material one of the entities is interacting with a machine one of the entities or a human one of the entities and is moving from one location to another location.

19. The non-transitory computer readable medium as set forth in claim 15, wherein the waste duration value is for a waiting waste and comprises a duration that a human one of the entities is idle and not interacting with any other of the entities.

20. The non-transitory computer readable medium as set forth in claim 15, wherein the waste duration value is for a motion waste and comprises a duration that a human one of the entities is not interacting with a material one of the entities or a machine one of the entities and is moving from one location to another location.

21. The non-transitory computer readable medium as set forth in claim 20, wherein the executable code, when executed by the processor, further causes the processor to determine one or more frequently followed paths based on the trajectories and output an indication of the frequently followed paths, wherein the frequently followed paths correspond with the one of the subset of subtasks classified as a waste subtask.

* * * * *